No. 744,148. PATENTED NOV. 17, 1903.
R. J. WILSON.
SELF WINDING TOP SPINNER.
APPLICATION FILED AUG. 9, 1902.
NO MODEL.
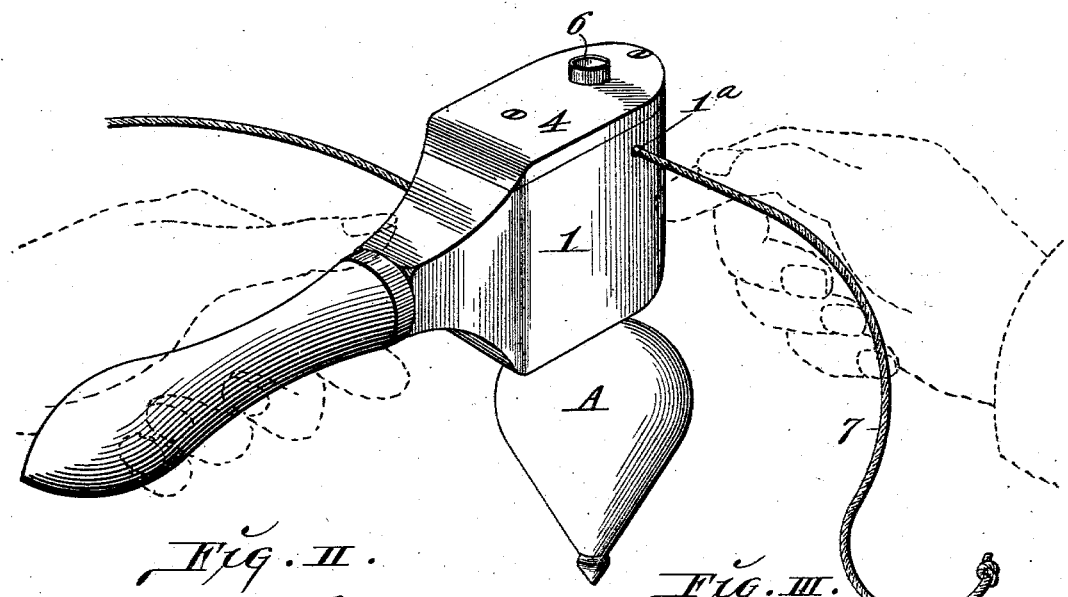
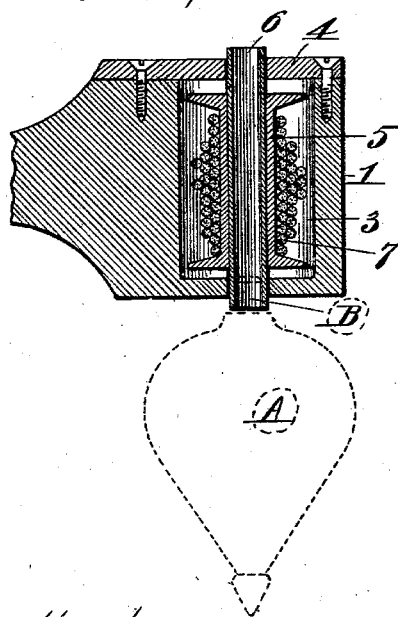
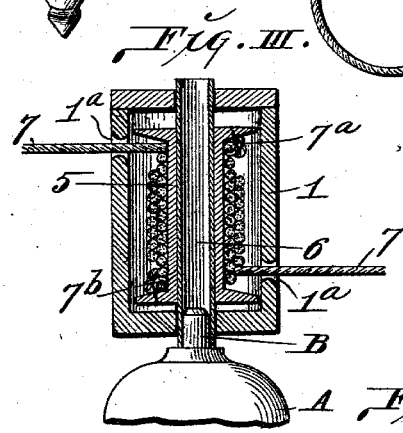
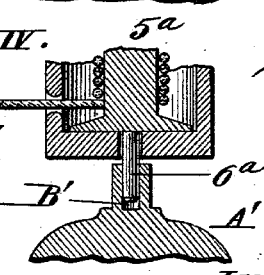
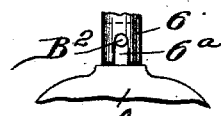
Attest:—
M. P. Smith
E. Knight
Inventor:—
Rob't J. Wilson
By Wright Bro, attys.

No. 744,148. Patented November 17, 1903.

UNITED STATES PATENT OFFICE.

ROBERT J. WILSON, OF ST. LOUIS, MISSOURI, ASSIGNOR OF ONE-THIRD TO JAMES P. JOY, OF ST. LOUIS, MISSOURI.

SELF-WINDING TOP-SPINNER.

SPECIFICATION forming part of Letters Patent No. 744,148, dated November 17, 1903.

Application filed August 9, 1902. Serial No. 119,054. (No model.)

*To all whom it may concern:*

Be it known that I, ROBERT J. WILSON, a citizen of the United States, residing in the city of St. Louis, in the State of Missouri, have invented a certain new and useful Improvement in Self-Winding Top-Spinners, of which the following is a full, clear, and exact description, reference being had to the accompanying drawings, forming part of this specification.

My invention relates to a device for use in spinning spinning-tops, the device being so constructed that a string forming a part thereof may be drawn through the device in either direction to impart rotation to a revolving spool or member having a spindle adapted to receive the spinning-top, which is thrown therefrom and spun upon the rotation of the spool.

The invention consists in features of novelty hereinafter fully described, and pointed out in the claim.

Figure I is a perspective view showing my top-spinner as it appears in the act of spinning a top therewith. Fig. II is a longitudinal section taken through the housing of the spinner. Fig. III is a transverse section taken through the housing of the spinner. Fig. IV is a similar view to Fig. III, illustrating a modification. Fig. V is a view showing a modification of the spool-spindle.

1 designates the housing of the spinner, which may be provided with a handle 2 or may be of cylindrical or other desirable form to be grasped readily by the hand of the person operating the spinner. The housing 1 contains a chamber 3 (see Figs. II and III) and is preferably provided with a cap 4, upon the removal of which access may be obtained to said chamber.

5 designates a spool or revolving member located in the housing-chamber 3. This spool is provided with a spindle 6, which may be of hollow form, as seen in Figs. II and III, or may be of the solid form indicated by $6^a$. (See Fig. IV.) The spindle extends through the top and bottom of the housing 1, and it is adapted to receive the application at either end of a top A or A'. Where the hollow form of spindle is used, the top A is provided with a stem B, adapted to seat in the spindle, and where the solid form of spindle is used the top is provided with a socket B', into which the spindle is fitted.

7 designates a cord which is fixed by any suitable means approximately central of its length to the spool 5, as seen at $7^a$ and $7^b$, Fig. III, and which is wound around the spool. (See Figs. II and III.) The cord 7 passes from the spool through apertures $1^a$ in the housing 1, to be drawn therethrough for the purpose of imparting rotation to the spool.

In the practical use of this device the operator by holding the housing 1 in one hand fits the top A to the spindle of the spool 5 or $5^a$ and then grasps either end of the cord 7 with the other hand. By an outward pull upon the cord the end thereof grasped is unwound from the spool 5, thereby imparting rotation to the spool and throwing the top in a spinning condition from the spool-spindle. At the same time that the end of the cord drawn upon is unwound from the spool the opposite end is wound thereonto, thereby putting the spinner in condition for the next spinning action by grasping the wound end and avoiding the necessity of winding the cord onto the spool after the top has been spun. By providing the spool 5 with a spindle adapted to receive a top at either end thereof I furnish a construction whereby the top may be spun in a corresponding direction, the only thing necessary to obtain this result being the reversal of the housing and the application of the top to the opposite end of the spindle to that to which it was previously applied.

As seen in Fig. III, the cord 7 is attached to the spool 5 at the point $7^a$ and $7^b$, each end of the cord terminating at the opposite end of the spool from that at which the corresponding aperture $1^a$ is located. The result of this construction in the operation of the spinner is that when either end of the cord 7 is drawn upon—as, for instance, the end at the left hand of Fig. III—the cord continues to unwind until that end is completely unwound and the point $7^b$ is reached. An upward pull is then exerted by the cord to lift the spool. This lifting of the spool raises the spindle 6 in the housing 1 and moves the top A into contact with the housing, so that the top will be forced away from the spindle and fall therefrom. It will be seen that the same result is obtained when the opposite end of the cord 7 is drawn upon, providing that the spinner is inverted from its former position.

In Fig. V, I have shown a modification of the spindle 6, in which a notch 6ª is formed to receive a stud B², projecting from the stem of the top, this construction being of particular utility in the spinning of heavy tops, of which the stems are liable to turn in the spindle by reason of resistance as a result of their weight.

I claim as my invention—

A top-spinner comprising a housing, a rotatable member located in said housing and adapted for longitudinal movement therein, a top-receiving spindle carried by said member and extending through said housing, and a cord connected to said member and adapted, when drawn upon, to move said spool longitudinally in said housing to throw the top into engagement with the housing to detach it from the spindle, substantially as set forth.

ROBERT J. WILSON.

In presence of—
E. S. KNIGHT,
M. P. SMITH.